Dec. 11, 1962   J. F. FRENCH   3,067,850
APPARATUS FOR PROCESSING PRODUCTS IN SEALED CONTAINERS
Filed Nov. 21, 1958   11 Sheets-Sheet 1

FIG_1

INVENTOR
JOHN F. FRENCH
BY Hans G. Hoffmeister
ATTORNEY

Dec. 11, 1962  J. F. FRENCH  3,067,850
APPARATUS FOR PROCESSING PRODUCTS IN SEALED CONTAINERS
Filed Nov. 21, 1958  11 Sheets-Sheet 4

FIG. 4

INVENTOR
JOHN F. FRENCH
BY
ATTORNEY

Dec. 11, 1962 J. F. FRENCH 3,067,850
APPARATUS FOR PROCESSING PRODUCTS IN SEALED CONTAINERS
Filed Nov. 21, 1958 11 Sheets-Sheet 5

INVENTOR
JOHN F. FRENCH
ATTORNEY

Dec. 11, 1962  J. F. FRENCH  3,067,850
APPARATUS FOR PROCESSING PRODUCTS IN SEALED CONTAINERS
Filed Nov. 21, 1958  11 Sheets-Sheet 8

INVENTOR
JOHN F. FRENCH
BY Hans G. Hoffmeister
ATTORNEY

Dec. 11, 1962  J. F. FRENCH  3,067,850
APPARATUS FOR PROCESSING PRODUCTS IN SEALED CONTAINERS
Filed Nov. 21, 1958  11 Sheets-Sheet 11

INVENTOR
JOHN F. FRENCH
BY Hans G. Hoffmeister
ATTORNEY

United States Patent Office 3,067,850
Patented Dec. 11, 1962

3,067,850
APPARATUS FOR PROCESSING PRODUCTS
IN SEALED CONTAINERS
John F. French, San Jose, Calif., assignor to FMC
Corporation, a corporation of Delaware
Filed Nov. 21, 1958, Ser. No. 775,435
2 Claims. (Cl. 198—24)

The present invention appertains to apparatus for processing products in sealed containers, and more particularly relates to apparatus for carrying out the continuous cooking and cooling of comestibles in sealed containers.

In many well known cookers having hydrostatic water legs of considerable height through which containers such as cans are conveyed, it has been necessary to provide flat walls to retain the cans in the conveyor. When these flat walls also define the pressure resisting walls of the hydrostatic legs, they must either be quite thick or be extensively reinforced to prevent bowing of the walls due to the pressure exerted on the walls by the water in the hydrostatic legs. Pressure cookers having either of these types of pressure resisting walls are quite expensive.

It is, therefore, one object of the present invention to provide an inexpensive apparatus for processing products in sealed containers.

Another object is to provide a continuous pressure cooker and cooler having a container carrying conveyor arranged to constrain the containers therein without the aid of cooperating retaining walls in the cooker.

Another object is to provide an improved cooker and cooler having cylindrical pressure resisting walls.

Another object is to provide an improved container arresting unit for a feed conveyor of a continuous cooker and cooler.

Another object is to provide an improved container carrier for a continuous cooker and cooler.

Another object is to provide a continuous cooker and cooler having an improved container feeding unit.

Another object is to provide a continuous cooker and cooler having an improved container feed unit arranged to feed containers into an endless conveyor along a straight run thereof.

Another object is to provide a continuous cooker and cooler having an improved container discharge unit arranged to discharge containers from a straight run of the can carrying conveyor.

These and other objects and advantages of the present invention will become apparent from the following description and the accompanying drawings, in which.

The continuous cooker and cooler 16 (FIGS. 1, 2 and 3) of the present invention comprises a cylindrical, vertically extending tank 17 divided into a cooking chamber 18 and a cooling chamber 19 by a partition 21. The cooking chamber 18 is filled with hot water for cooking the contents of sealed containers, which hereinafter will be referred to as cans, and the cooling chamber 19 is provided with a plurality of water spray troughs 22 for spraying cold water onto the cans to cool the cans and contents therein to an acceptable discharge temperature.

Filled and sealed cans are raised by an elevator 23 (shown diagrammatically at the left side of FIG. 1) to a position at a higher elevation than the tank 17 where the cans are received by a feed conveying system 24 (FIG. 2) and are moved into position above the tank 17 and alongside a pusher mechanism of a cooker feed unit 26. The feed unit 26 (FIG. 1) moves lines of several cans successively from the conveying system 24 into the pockets P (FIG. 5) of a plurality of elongated can carriers 27. The carriers 27 are connected together to define an endless conveyor 28 (FIG. 1) movable through the cooking chamber 18 and cooling chamber 19 and arranged to be continually driven in the path indicated by the arrows A in FIG. 1.

After a line of cans has been moved into the pocket P (FIG. 5) of a carrier 27 by the feed unit 26 (FIG. 1), the line of cans is moved down and then up through the hot water in the cooking chamber 18 and thereafter down and up through the sprayed water in the cooling chamber 19. The line of cans is then moved into position to be discharged from its carrier pocket P by a discharge unit 29. The successive lines of cans are received on a discharge conveying system 31 (FIG. 2) which advances the cans to the downward moving run of the elevator 23 for discharge from the continuous cooker and cooler 16.

More specifically, the continuous cooker and cooler 16 comprises the vertically extending tank 17 (FIG. 1) which is supported on a floor F having a drainage trough 32 formed therein. Drain valves 33 and 34 of any suitable type are connected to the bottom wall 36 of the tank 17 and communicate with the cooling chamber 19 and cooking chamber 18, respectively. The valves 33 and 34 are used when complete drainage of the tank 17 is required. Larger drain valves 37 and 38 which communicate with the cooling chamber 19 and cooking chamber 18, respectively, are used to drain the major portion of these chambers when required. Angle gussets 39 (FIG. 3) are welded to the cylindrical wall 41 of the tank 17 and to the feet 42 which are securely bolted to the floor F to add stability to the tank 17.

A lower inspection platform 46 (FIG. 1) is generally

Figure 1:
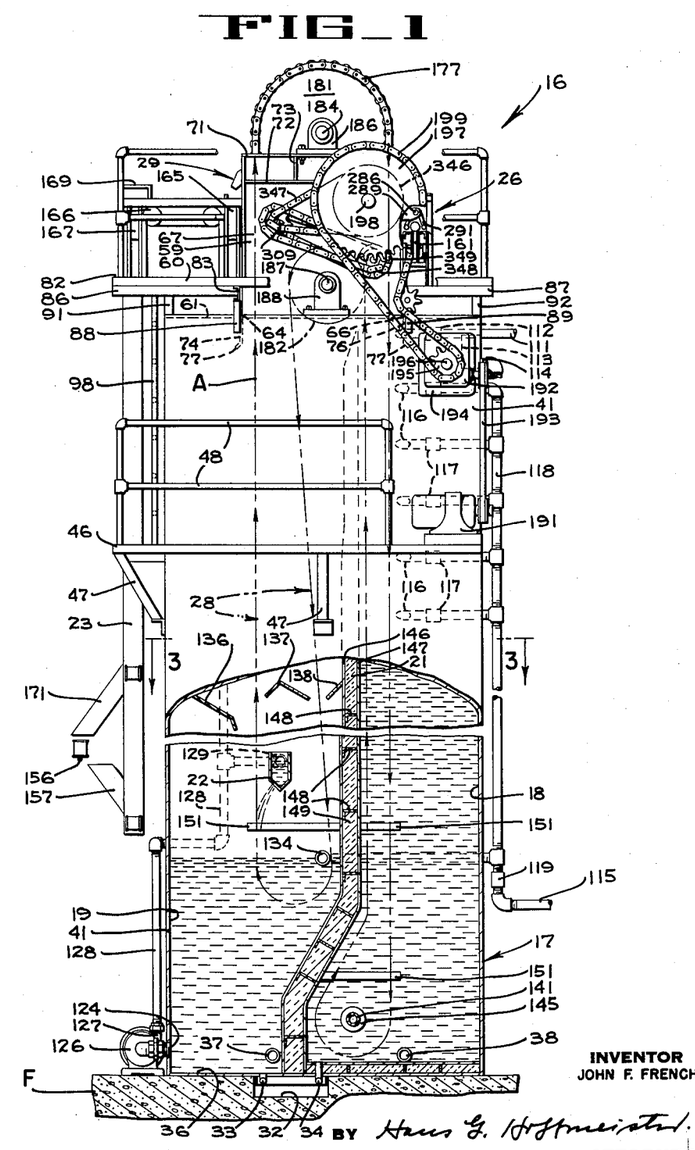
FIG. 1 is an elevation of the continuous cooker and cooler of the present invention with certain parts shown diagrammatically and other parts cut away and shown in section.
Figure 2:
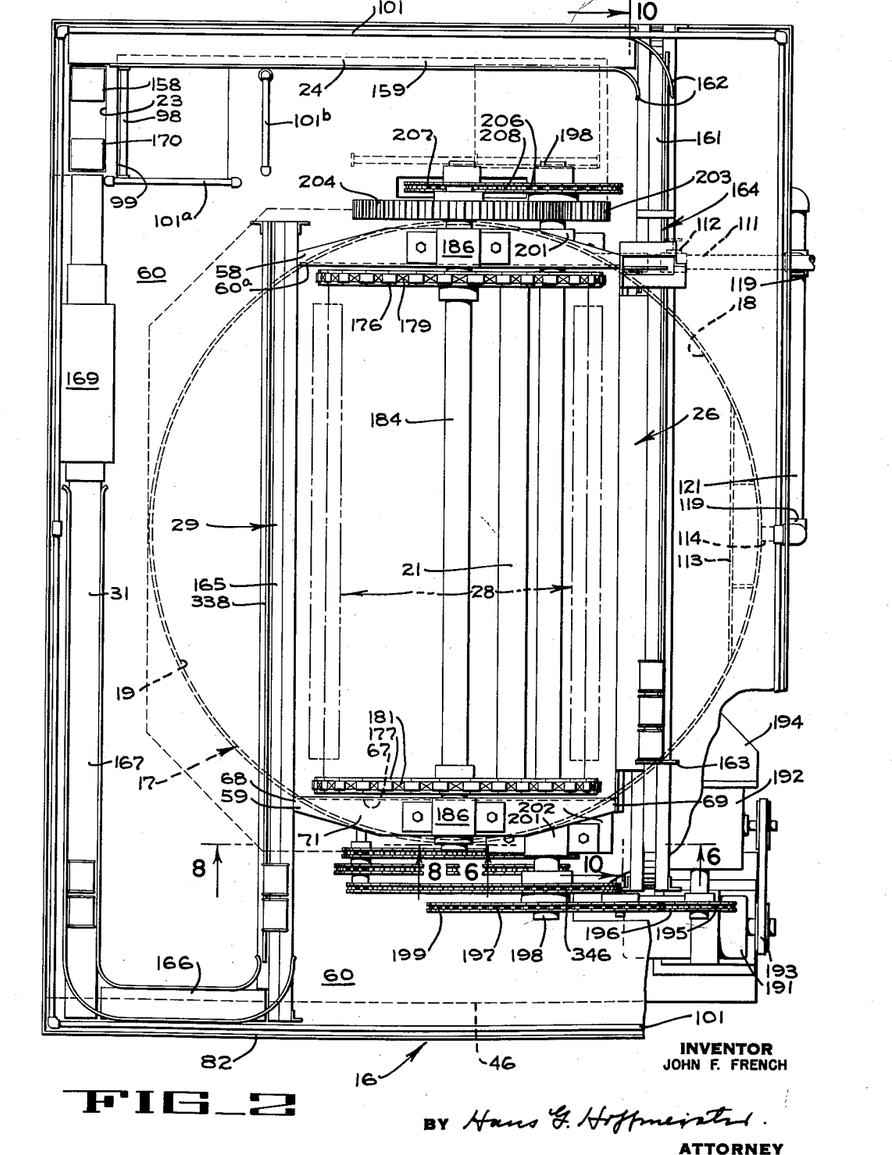
FIG. 2 is an enlarged plan of the cooker and cooler of FIG. 1, certain parts of the feed unit and discharge unit being omitted and other parts being cut away.

U-shaped as indicated by the dotted lines in FIG. 2, and is secured to the cylindrical wall 41 of the tank 17 by several angle bracket assemblies 47 (only two being shown in FIG. 1). Guard rails 48 are secured to and project upwardly from the platform 46 and extend around both the outer and the inner edges of the platform 46. Appropriate ladders (not shown) provide access to the platform 46.

Figure 4:
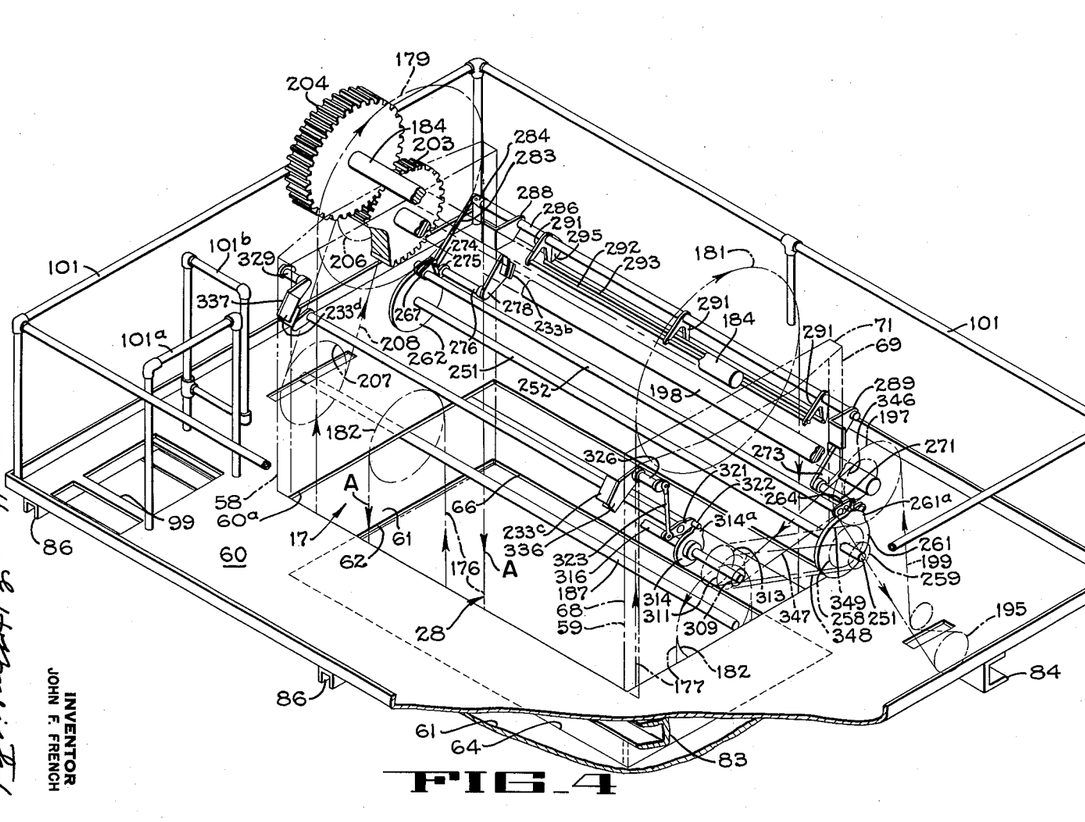
FIG. 4 is an enlarged diagrammatic perspective of the drive for the continuous cooker and cooler of the present invention, certain parts being shown in phantom and other parts being removed.

Spaced vertically extending conveyor supporting members 58 and 59 (FIGS. 2 and 4) extend down through an opening 60a in a platform 60 and through a rectangular opening 62 in the top wall 61 of the cylindrical tank 17. The lower end portions of the members 58 and 59 are secured, as by welding, to the wall 61 of the tank. The conveyor 28 enters and leaves the tank 17 through the opening 62. The supporting members 58 and 59 are identical and therefore the description of the member 59 and the way in which it is mounted on the tank 17 will suffice for both members.

The member 59 comprises a flat vertical wall 67 (FIG. 2) parallel with and adjacent one end of the opening 62. Vertical flanges 68 and 69 are rigid with the wall 67 and are parallel to the longitudinal edges 64 and 66, respectively, of the opening 62. An upper, horizontally disposed bearing support flange 71 (FIG. 1) is rigidly secured to the wall 67 and to the flanges 68 and 69. A horizontal stiffening plate 72 is welded to the wall 67 and to the vertical flanges 68 and 69. Vertical stiffening ribs 73 (only one being shown) are welded between the stiffening plate 72 and the horizontal flange 71 to add rigidity to the flange 71. The lower end of the wall 67 is welded to the top wall 61 of the tank 17 while the lower ends of the flanges 68 and 69 are welded to the platform 60. To provide additional stiffness to the members 58 and 59, a pair of vertical plates 74 and 76 (FIG. 1) which have outwardly directed lower ends 77, project into the opening 62 and are secured between the members. The plate 74 is welded to the longitudinal edge 64 of the opening 62 and to the vertical flanges 68 of the members 58 and 59. Likewise, the plate 76 is welded to the outer longitudinal edge 66 of the opening 62 and to the flanges 69 of the members 58 and 59.

The upper platform 60 is of rectangular shape as shown in FIG. 2 and is supported by and is positioned slightly above the tank 17. The platform 60 has a rectangular rim 82 rigidly secured to channel members 83 and 84, which extend the full width of the platform 60, and to several channel members 86 and 87 (FIG. 1) which extend outward from the tank 17, and are rigidly secured to the channel members 83 and 84, respectively. The channel member 83 is welded to the plate 74 and to two short vertical channel members 88 (only one being shown) which are welded to the cylindrical wall 41 of the tank 17 and to the flanges 68 of the support members 58 and 59. Similarly, the channel member 84 (FIG. 4) is rigidly secured to the plate 76 (FIG. 1) and abuts a pair of short vertical channel members 89 (only one being shown) which are welded to the cylindrical wall 41 and to the flanges 69 of the support members 58 and 59. The outer end portions of the channel members 86 and 87 are secured to elongated beams 91 and 92, respectively, which are welded to the top wall 61 of the tank 17 and extend parallel to the channel members 83 and 84. The platform 60 has a suitable deck which is secured within the rectangular rim 82 and is provided with the opening 60a in registry with the opening 62. An upper ladder 98 (FIG. 2) is secured between the lower platform 46 and the upper platform 60 adjacent an opening 99 in the platform 60 through which an operator can gain access to the upper platform 60. Guard rails 101, 101a and 101b are provided around the outer perimeter of the platform 60 and adjacent the opening 99 to protect the operator from accidentally falling from the platform 60. The guard rail 101b is pivotally mounted on the platform 60 and can be pivoted away from the opening 99 to permit an operator to move from the opening 99 onto the platform 60.

The cooking chamber 18 (FIG. 1) is filled with water through a pipe line 111 (FIG. 2), which is connected to any suitable water supply source and has a control valve 112 therein. The pipe line 111 communicates with the cooking chamber 18 adjacent the upper end thereof and provides means for directing a controlled amount of cold make-up water into the cooking chamber 18 to establish and maintain a temperature gradient in the cooking chamber 18 during operation of the cooker and cooler 16.

An overflow trough 113 (FIG. 2) is welded to the upper end of the cylindrical wall 41 in the cooking chamber 18 and communicates with an overflow pipe line 114 which discharges the overflow water from the continous cooker and cooler 16 through a pipe 115 (FIG. 1).

Since certain products require less cooking time than others, a plurality of identical water level control conduits 116, each including a control valve 117, communicate with the chamber 18 at different elevations as indicated in FIG. 1. The conduits 116 are all connected to a vertical pipe line 118 which is connected to the overflow pipe line 114 by two pipe T's 119 (FIG. 2) interconnected by a horizontal pipe 121 (FIG. 2). It is, therefore, apparent that the level of the water in the cooking chamber 18 is maintained at an even elevation with the upper edge of the overflow trough 113 when all the valves 117 are closed. It is also apparent that, if any of the valves 117 are open, the water level will be even with the lowest one of the water level control conduits whose valve 117 is open.

Figure 3:
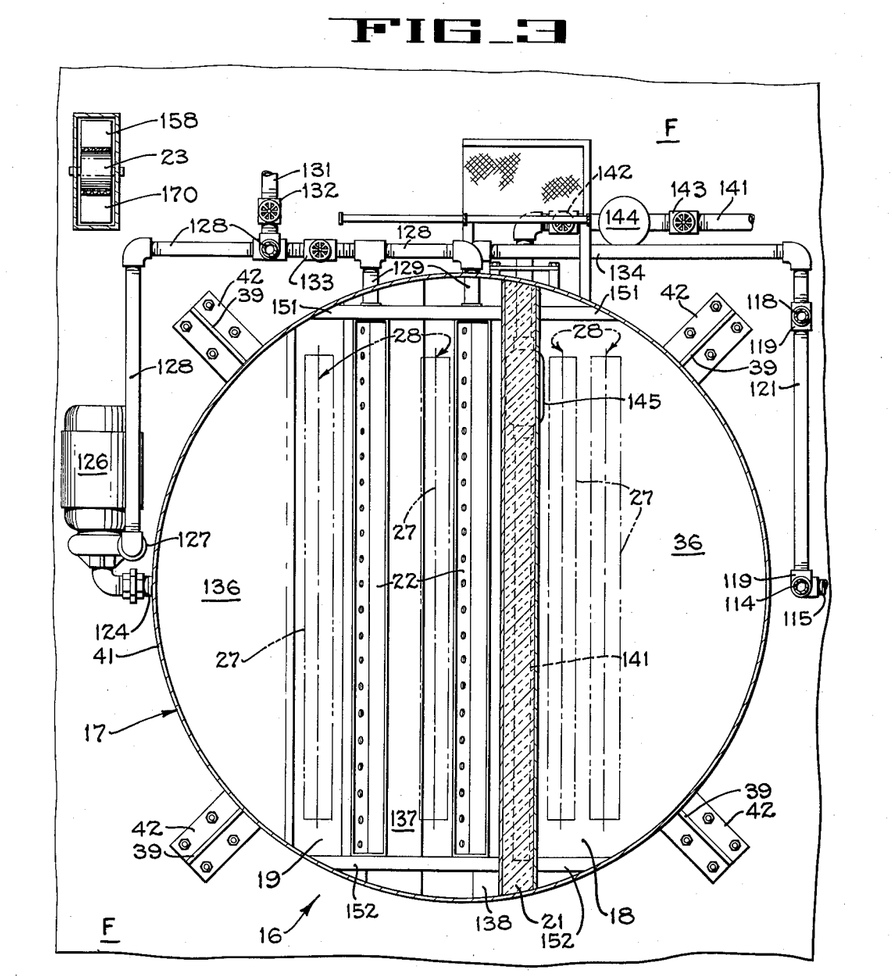
FIG. 3 is an enlarged horizontal section taken along lines 3—3 of FIG. 1.

As shown in FIGS. 1 and 3, the suction inlet 124 of a recirculating pump 126 is connected to the cooling chamber 19 adjacent the bottom thereof. The outlet 127 of the pump 126 is connected to a pipe line 128 which includes a plurality of pipe sections 129 which discharge water into the aforementioned perforated troughs 22. Cold water is introduced into the pipe line 128 through a feed pipe 131 (FIG. 3) connected to the pipe line 128 and to a suitable source of cold water. A valve 132 in the feed pipe 131 controls the amount of make-up water entering the pipe line 128, and a valve 133 (only one shown) in the pipe line 128 adjacent each trough or pair of troughs 22, controls the amount of water entering the associated troughs 22. The water flows from the perforated troughs 22 in a spray which contacts the cans and the can carriers 27 and cools the same. The cooling water is collected in the bottom of the cooling chamber 19 and a portion of the collected water is recirculated by the pump 126 to again be sprayed on the cans. The excess water is drained from the cooling chamber 19 through a drain conduit 134 which is connected to the overflow pipe line 114 by the T's 119 and the horizontal pipe 121. It will be apparent that the amount of make-up water entering the cooling chamber 19 can be controlled by adjusting the valve 132 to maintain the recirculated water at a desired cooling temperature which temperature is preferably kept below 60° F. To improve the cooling characteristics in the cooling chamber 19 (FIG. 1), a plurality of baffles 136, 137 and 138 are provided to prevent water sprayed from the troughs 22 from falling directly into the collected water at the bottom of the chamber 19 without first contacting the cans and carriers 27.

The water in the cooking chamber 18 is heated by steam which enters the chamber 18 through a pipe line 141 (FIG. 3). The pipe line 141 is connected to a boiler (not shown) and includes manual control valves 142 and 143 and an automatically operated temperature controlling valve 144, of any suitable well known type, which is arranged to automatically regulate the flow of steam into the chamber 18 to maintain the water therein at a predetermined temperature. The portion of the pipe line 141 that is disposed in the cooking chamber 18 includes a steam and water mixing chamber 145 through which steam is efficiently discharged into the water in the cooking chamber 18.

The previously mentioned partition 21 (FIG. 1), which divides the cylindrical tank 17 into the cooking chamber 18 and cooling chamber 19, includes two spaced walls 146 and 147 having stiffening angle members 148 secured therebetween to prevent the flat walls of the partition 21 from bowing. A layer of insulating material 149 is included between the walls 146 and 147 to minimize heat transfer between the chambers 18 and 19.

A plurality of horizontally disposed, vertically spaced angle members 151 (FIG. 1) are in planar alignment with the vertical wall 67 of the conveyor supporting member 58 and similar angle members 152 (FIG. 3) are in planar alignment with the wall 67 of the supporting member 59. Both the cooking chamber 18 and the cooling chamber 19 have several of the angle members 151 and 152 therein which members are welded to the cylindrical wall 41 and to the partition 21.

The conveying structure for moving the cans to the cooker feed unit 26 (FIG. 1) and for moving the processed cans from the discharge unit 29 away from the cooker and cooler 17 is as follows. Filled and sealed cans are advanced by a conveyor 156 from a sealer (not shown). The conveyor 156 moves the cans onto a chute 157 that discharges the cans into pockets in the upwardly moving run 158 (FIG. 2) of the elevator 23. The cans are discharged from the elevator 23 onto the conveyor 24 which includes a continuously driven conveyor 159 disposed above and supported by the upper platform 60. The cans are guided from the conveyor 159 to a continuously driven conveyor 161, extending at right angles thereto, by guide rails 162. An abutment member 163 prevents the cans from being discharged off the end of the conveyor 161 and stops a line of cans disposed end-to-end in position to be moved laterally into the pocket P (FIG. 5) of each carrier 27 by the feed unit 26 (FIG. 1) as the carriers 27 move therepast. A can arresting unit 164, which will be described presently, is disposed on the inlet side of the feed unit 26 and cooperates with the conveyor 161 to eliminate the possibility of a can being only partially disposed in the feed unit 26 when the unit is actuated to move a line of cans into a carrier pocket. Actuation of the unit 26 at such a time would cause a can jam on the conveyor 161.

After the rows of cans have been moved through the cooking chamber 18 and cooling chamber 19, they are discharged from the carriers 27 by the discharge unit 29. The successively discharged rows of cans are received on a conveyor 165 (FIG. 2) of the discharge conveying system 31 and are advanced thereby onto an intermediate conveyor 166 disposed at right angles to the conveyor 164. The conveyor 166 discharges the cans onto a conveyor 167 which is parallel to the conveyor 165. Suitable can guides guide the cans from the conveyor 165 onto the conveyors 166 and 167. The cans on the conveyor 167 pass through a can turning unit 169 of any well known design which turn the cans 90°. The cans are then discharged from the conveyor 167 onto the downwardly moving run 170 of the elevator 23. An inclined chute 171 (FIG. 1) receives the cans from the elevator 23 and guides them onto the conveyor 156 for conveyance to other processing equipment or storage.

The carrier conveyor 28, which moves the cans through the cooking chamber 18 and cooling chamber 19, comprises a pair of spaced parallel endless chains 176 and 177 (FIG. 2) having one of the carriers 27 (FIG. 5) secured to and extending between each pair of horizontally aligned links 178 of the chains 176 and 177. The chains 176 and 177 are trained around upper sprockets 179 and 181 (FIG. 4), respectively, and around sprockets 182 (only one being shown in FIG. 1) positioned therebelow. The upper sprockets 179 and 181 are keyed to a shaft 184 journalled in spaced bearings 186 (FIG. 2) bolted to the upper horizontal flanges 71 of the support members 58 and 59. The sprockets 182 (FIG. 1) are keyed on a shaft 187 which is journalled in spaced bearings 188 bolted to the top wall 61 of the tank 17. As will be explained in more detail later, a conveyor track 189 (FIG. 5) is provided to guide each of the chains 176 and 177 of the conveyor 28 through the cooking chamber 18 and cooling chamber 19 and hence no sprockets are required in these chambers.

The drive shafts 184 and 187 of the conveyor 28 (FIG. 1) are continuously driven by a motor 191 which is mounted on an extension of the lower platform 46. The motor 191 is connected to a speed reducing gear box 192 by a belt or chain drive 193. The gear box 192 is suitably secured to a bracket 194 which is welded to the cylindrical wall 41 of the tank 17. A sprocket 195 keyed on the output shaft 196 of the gear box 192 is connected to a sprocket 197, keyed on an idler shaft 198, by a chain 199. The idler shaft 198 is journalled in spaced bearings 201 (FIG. 2) which are bolted on brackets 202 welded to the support members 58 and 59. A spur gear 203 keyed on the idler shaft 198 meshes with a spur gear 204 keyed on the shaft 184 and drives the shaft 184 clockwise as viewed in FIG. 1. A sprocket 206 (FIGS. 2 and 4) keyed on the idler shaft 198 is connected to a sprocket 207 keyed to the shaft 187 by a chain 208 and drives the shaft 187 counterclockwise as viewed in FIG. 1. Through the above described drive parts, the conveyor 28 is driven in the path indicated by the arrows A in FIGS. 1 and 4.

Figure 5:
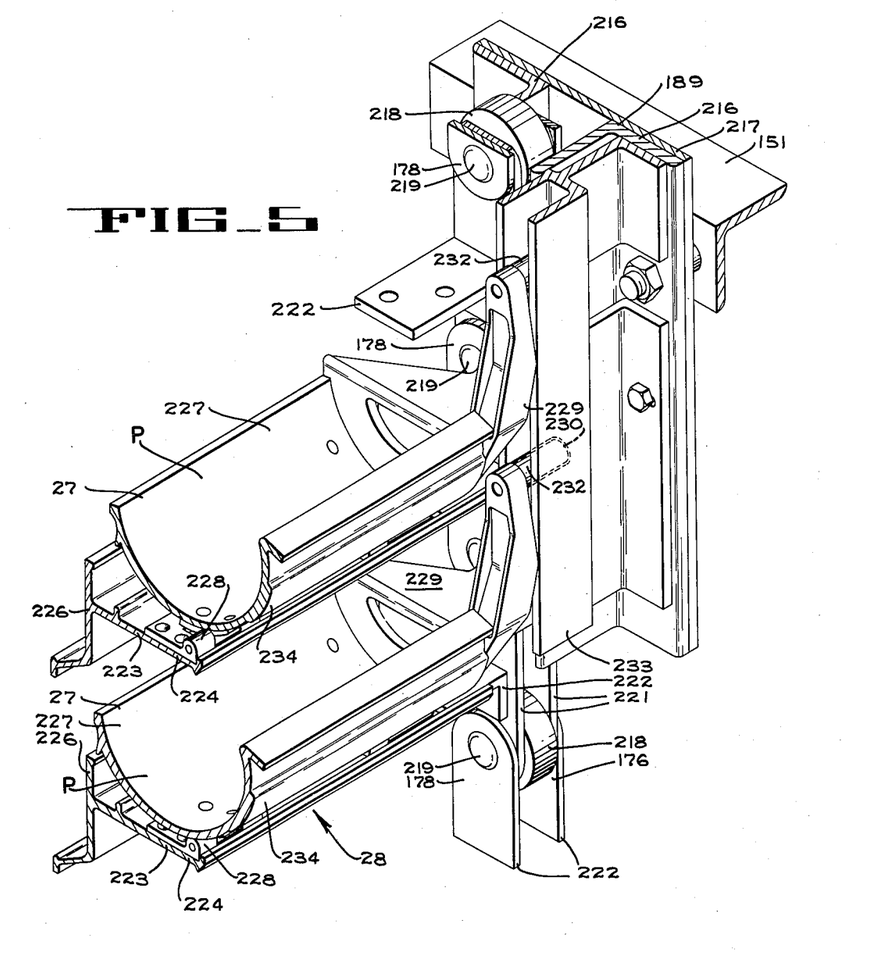
FIG. 5 is an enlarged perspective of a portion of the container conveyor, shown with the carrier pockets in a closed position.

One end of each of two of the can carriers 27 and a portion of one of the conveyor tracks 189 which guide the carriers through the continuous cooker and cooler 16 are shown in FIG. 5. Since both ends of the can carriers and cooperating parts are identical, the description of the end of one of the carriers shown in FIG. 5 will suffice for both ends. Each of the conveyor tracks 189 comprises spaced angle members 216 which are welded to a plate 217. The tracks 189 are bolted to the adjacent horizontal angle members 151 or 152 (FIG. 3) and to the adjacent wall 67 (FIG. 2) of one of the supporting members 58 or 59.

Each link 178 (FIG. 5) of the chain 176 includes two spaced side plates 221, and the side plates of adjacent links are pivotally interconnected by a pivot pin 219 which journals a roller 218. A carrier supporting ear 222 is welded to each of the inwardly disposed plates 221 of the chains 176 and 177, and the opposite ends of each carrier body 223 are bolted or riveted to one of the horizontally aligned pairs of ears 222 of the chains 176 and 177. Each carrier body 223 is a rigid beam approximately six feet long and is preferably die cast aluminum. The body 223 includes a can supporting and cover supporting wall 224 and a J-shaped can constraining wall 226. An elongated, semicylindrical cover 227 is pivotally connected to the supporting wall 224 of the body 223 by a plurality of hinge elements 228 spaced therealong.

Each end of each cover 227 has riveted thereon an actuating arm 229 which provides an end closure for the cover 227 and provides means for pivotally opening and closing the cover. An extension 230 is integral with each arm 229 and extends outwardly therefrom in a direction parallel to the pivotal axes of the covers 227. Wear bushings 232, which are mounted on the transverse extensions 230, are slidably received in cover controlling cam tracks 233, which tracks are bolted to one of the angle members 216 of the conveyor tracks 189. Each cover has a raised abutment surface 234 on its convex side and, as will be described later, when the covers 227 are opened to discharge cans therefrom, the cans roll outwardly from one cover and contact the raised can abutment surface 234 on the cover immediately below before rolling into the discharge conveyor 165.

Figure 6:
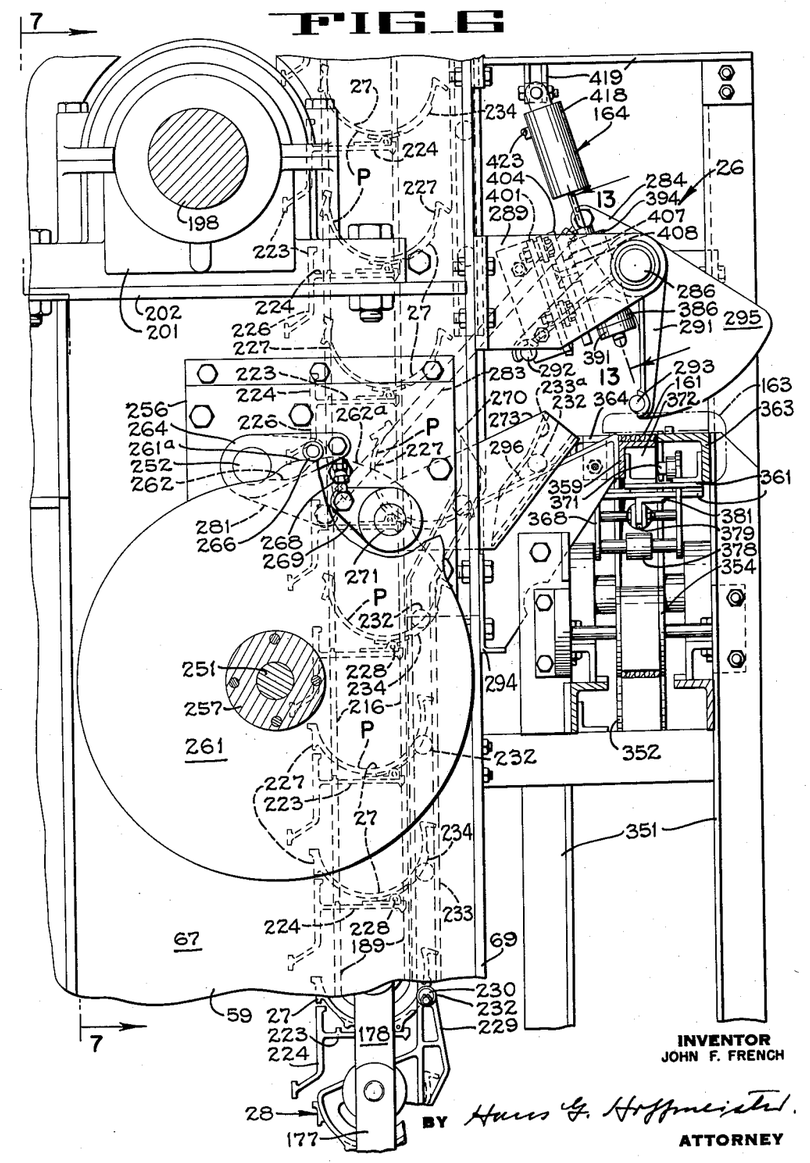
FIG. 6 is an enlarged vertical section taken along lines 6—6 of FIG. 2 showing the cooker feed unit of the present invention.
Figure 7:
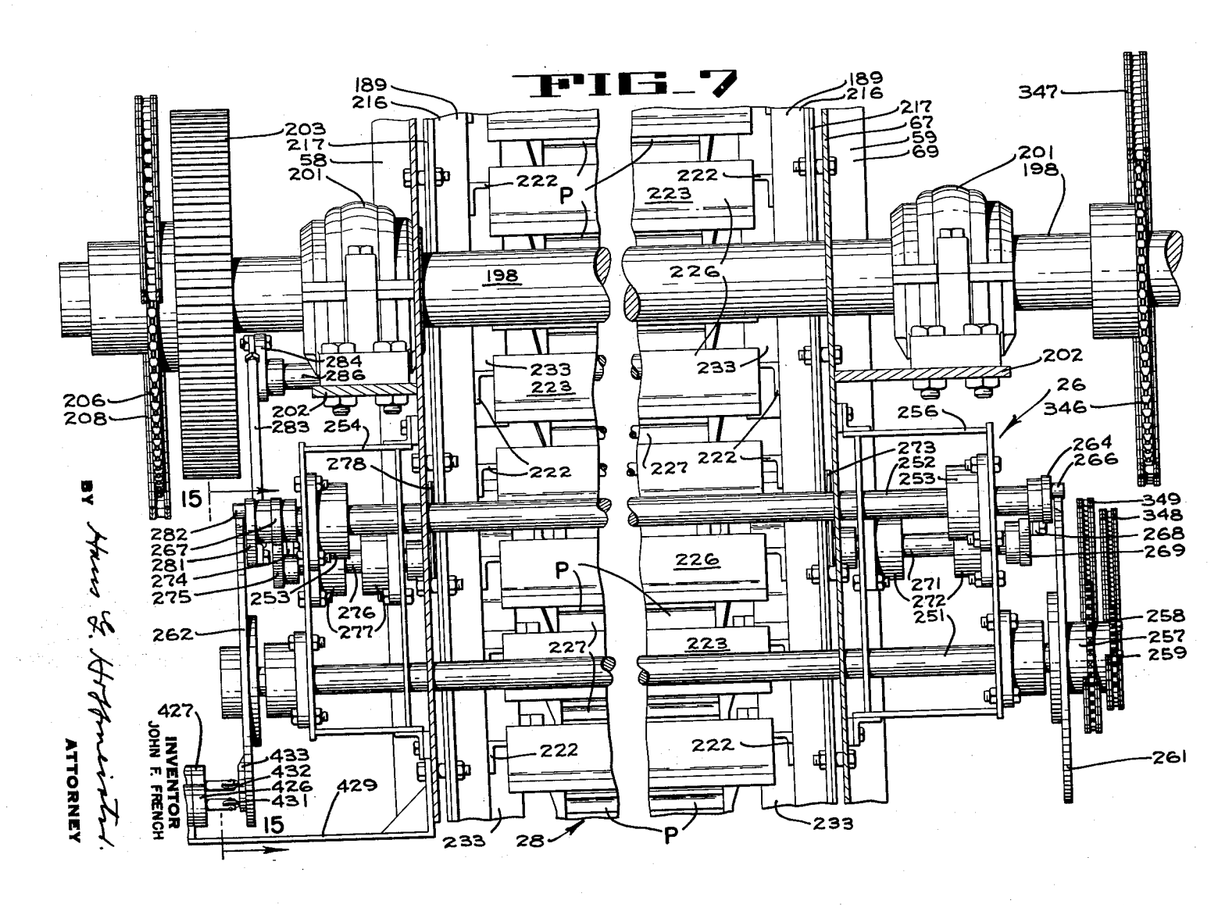
FIG. 7 is a vertical section of the feed unit of FIG. 6 taken along lines 7—7 of FIG. 6, certain parts being cut away.

The function of the feed unit 26 (FIGS. 4, 6 and 7) is to open each carrier cover 227 in its turn as the cover passes thereby, laterally discharge a line of cans from the conveyor 161 (FIG. 6) into the open pocket P of the carrier, and thereafter close the pocket.

The feed unit 26 comprises a cam shaft 251 and a rocker shaft 252 which extend laterally between the conveyor supporting members 58 and 59 (FIG. 7) and are journalled in bearings 253 which are bolted to brackets 254 and 256 rigidly secured to the supporting members 58 and 59, respectively. A hub 257, having sprockets 258 and 259 and a disc cam 261 bolted thereto, is keyed on the end of the cam shaft 251 adjacent the supporting member 59. A similar disc cam 262 is keyed to the cam shaft 251 adjacent the other end thereof. The cams 261 and 262 have lobes 261a and 262a, respectively (FIG. 6), on their peripheries. A rocker arm 264 (FIGS. 6 and 7), having a cam follower 266 journalled thereon is keyed to the rocker shaft 252 with the cam follower 266 arranged to roll on the periphery of the cam 261. A rocker arm 267, which is similar to and extends outwardly in the same direction as the rocker arm 264, is keyed to the shaft 252 adjacent the other end thereof.

A link 268 (FIGS. 6 and 7) is pivotally connected to the rocker arm 264 and to a crank arm 269 which is keyed to one end of a stub shaft 271. The stub shaft 271 is journalled in bearings 272 bolted to the bracket 256. The stub shaft 271 projects through the supporting member 59 and has an arm 273 keyed thereon which supports a movable section 233a of the cover control cam track 233 adjacent an outwardly bowed portion 270 thereof and adjacent the chain 176.

Similarly, a link 274 (FIGS. 4 and 7) is pivotally connected to the rocker arm 267 and to a crank arm 275 which is keyed to a stub shaft 276. The stub shaft 276 is journalled in bearings 277 which are bolted to the bracket 254. One end of the stub shaft 276 projects through the support member 58 and has an arm 278 (FIG. 4) keyed thereon. A section 233b of the cover cam track 233, which is similar to the section 233a and is in planar alignment therewith, is disposed adjacent the chain 176 and is secured to the arm 278.

Rotation of the cam shaft 251 in timed relation with the movement of the carrier conveyor 28 causes the cam lobe 261a to contact the cam follower 266 to pivot the rocker shaft 252 once for each revolution of the shaft 251. The pivotal movement of the rocker shaft 252 causes pivotal movement of the stub shafts 271 and 276 through the above described connecting parts. The pivotal movement of the shafts 271 and 276 causes the sections 233a and 233b of the cover cam tracks 233 (FIG. 6) to move outwardly and thereafter return to their normal position in alignment with the main portions of their associated tracks 233. This movement occurs during the passage of each carrier 27 at the time that the cover actuating wear bushings 232 of the particular cover 227 are disposed in the track sections 233a and 233b whereby the cover is opened to can-receiving position and then closed.

In order to move a line of cans from the conveyor 161 (FIG. 6) into each carrier pocket P while the carrier cover 227 is open, a rocker arm 281 (FIG. 7) is journalled on the rocker shaft 252 and rotatably carries a cam follower 282 which rides on the periphery of the cam 262. A link 283 (FIGS. 6 and 7) is pivotally connected to the rocker arm 281 and to a crank arm 284 which is keyed to a can pusher shaft 286. The can pusher shaft 286 extends across the machine and is journalled in bearing brackets 288 and 289 (FIG. 4) which are bolted to the conveyor support members 58 and 59, respectively. The shaft 286 is parallel to and disposed above the feed conveyor 161 and has a plurality of inverted V-shaped arms 291 secured thereto. Can pusher bars 292 and 293 are welded to the ends of the V-shaped arms 291 and are disposed on opposite sides of a row of cans disposed on the conveyor 161 at the push-off station. The bars 292 and 293 are slightly shorter than the length of the carriers 27 and, upon being pivotally actuated, they push a line of cans into a carrier pocket P as the pocket passes thereby. A can stopping wing 295 is welded to the upstream arm 291 and is arranged to hold back the cans on the conveyor 161 that are immediately behind the cans at the push-off station. A bracket 294 is bolted to the support member 59 at a position between the conveyor 161 and the carriers 27. This bracket 294 is an elongated member which extends across the machine and is connected also to the support member 58. A downwardly inclined surface 296 of the bracket 294, which is cut away adjacent each end to provide mechanical clearance for the arms 273 and 278 (FIG. 4) and their supporting track sections, acts as a chute between the conveyor 161 (FIG. 6) and the carriers 27 at a point where the carrier covers 227 are open.

Shortly after the cam 261 has opened the cover 227 of the particular carrier 27 which is in position to be filled adjacent the lower edge of the inclined surface 296, the lobe 262a of the cam 262 contacts the cam follower 282 (FIG. 7) causing the rocker arm 281 to pivot in a counterclockwise direction (FIG. 6) whereby the shaft 286 is pivoted, by means of the above described linkages, in a clockwise direction causing the can pusher bar 293 to move a line of cans off the conveyor 161, down the inclined surface 296 and into the pocket P, before the cover 227 closes. Each of the carriers is, in turn, filled in the above described manner.

Figure 8:
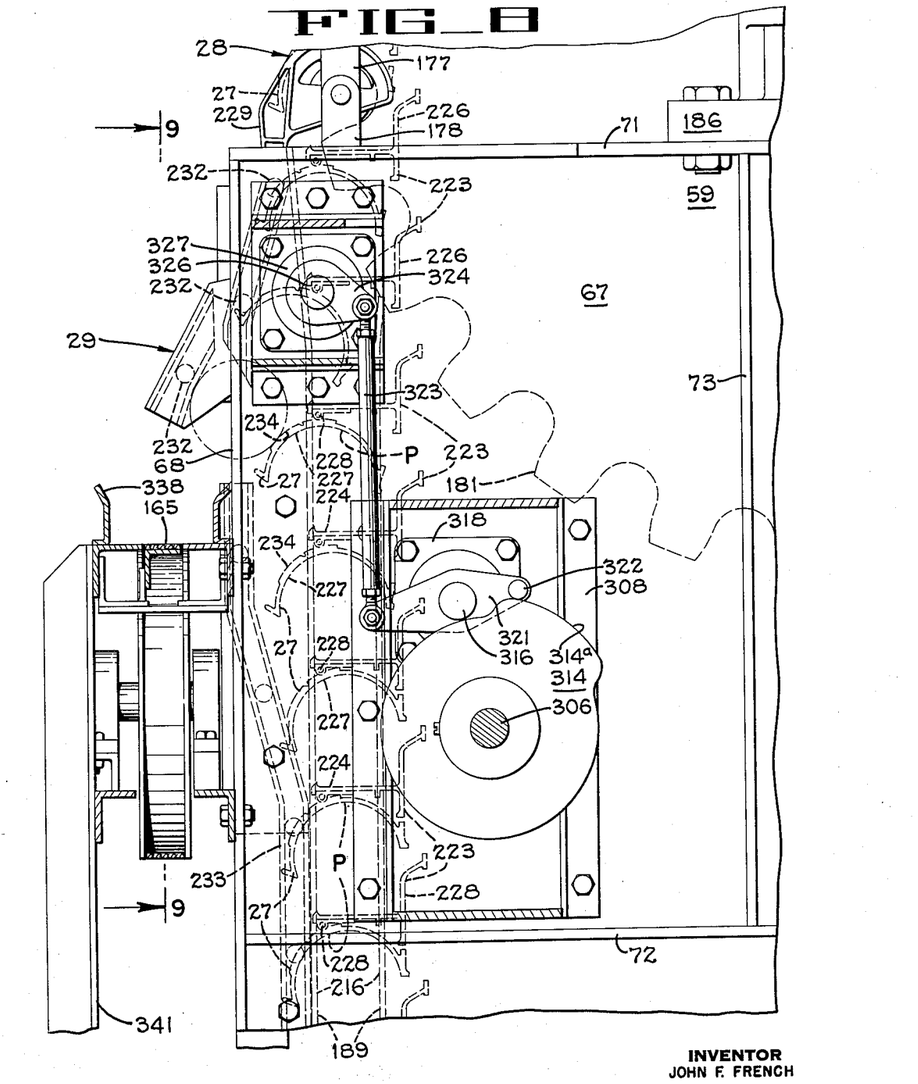
FIG. 8 is an enlarged vertical section taken along lines 8—8 of FIG. 2 showing the discharge unit.
Figure 9:
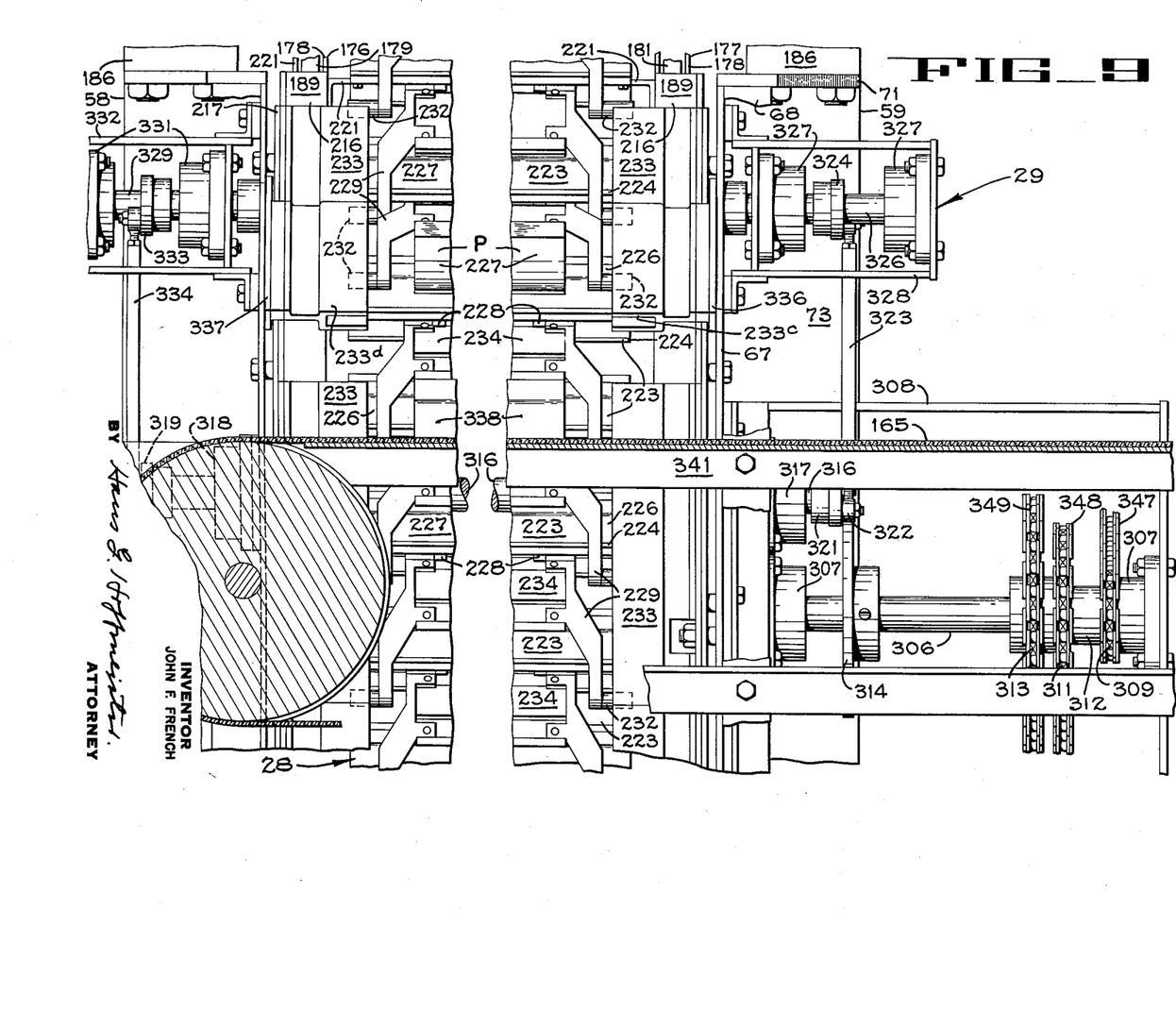
FIG. 9 is a vertical section taken along lines 9—9 of FIG. 8, certain parts being cut away.
Figure 10:
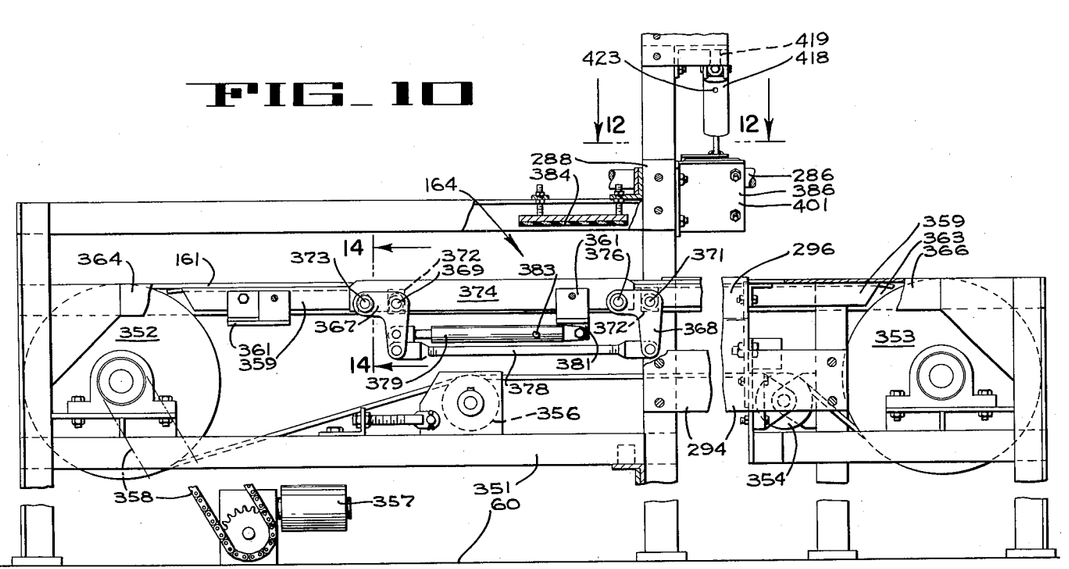
FIG. 10 is a vertical section taken along lines 10—10 of FIG. 2 showing the can arresting unit, certain parts being broken away.
Figure 11:
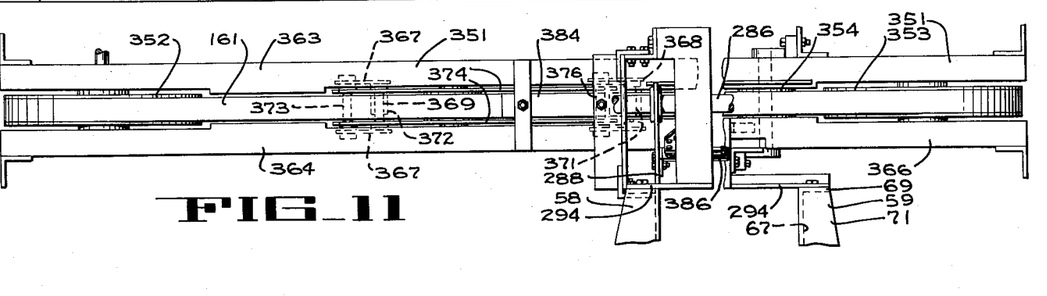
FIG. 11 is a plan of the arresting unit shown in FIG. 10, certain parts being broken away.
Figure 12:
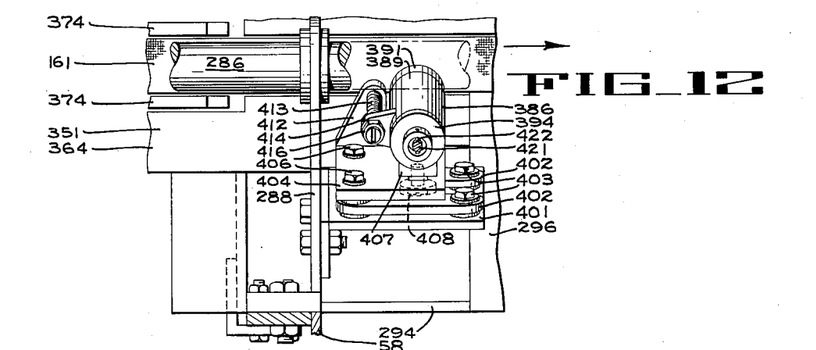
FIG. 12 is an enlarged horizontal section taken along lines 12—12 of FIG. 10.
Figure 13:
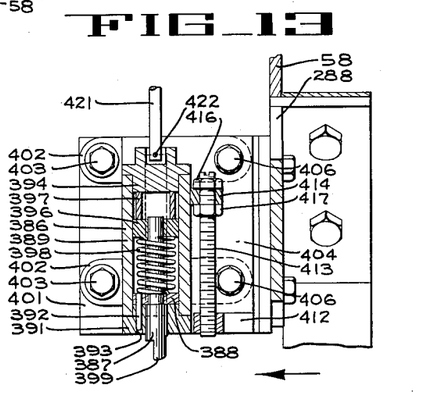
FIG. 13 is an enlarged section taken along lines 13—13 of FIG. 6.
Figure 14:
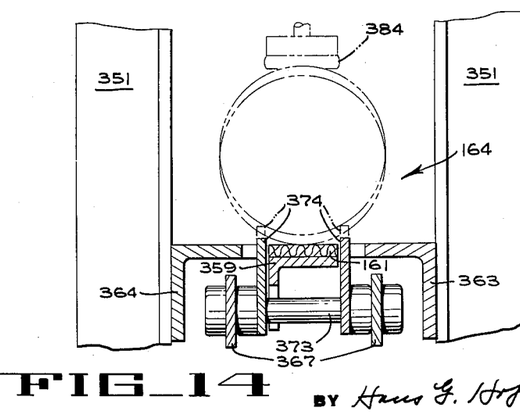
FIG. 14 is an enlarged vertical section taken along lines 14—14 of FIG. 10 showing the can arresting unit in operative and inoperative positions.

The discharge unit 29 (FIGS. 8 and 9) comprises a stub cam shaft 306 which is journalled in bearings 307 (FIG. 9) bolted to a bearing support bracket 308 which is in turn bolted to the conveyor support member 59. A small diameter sprocket 309 and a large diameter sprocket 311 are rigidly secured to a hub 312 which is journalled on the cam shaft 306. A drive sprocket 313 and a disc cam 314 are keyed to the cam shaft 306. A rocker shaft 316 is journalled in a bearing 317 bolted to the bracket 308 and in a bearing 318 bolted to the conveyor support member 58. The rocker shaft 316 has rocker arms 319 and 321 keyed adjacent opposite ends thereof, and the arm 321 has a cam follower 322 journalled thereon and disposed in position to ride against the periphery of the cam 314. A lobe 314a on the cam 314 engages the cam follower 322 once for each revolution of the shaft 306 causing the rocker shaft 316 to be pivotally actuated. A link 323 is pivotally connected between the arm 321 and a crank arm 324 keyed to a short track actuating shaft 326. The track actuating shaft 326 is journalled in bearings 327 which are bolted to a bearing bracket 328 secured to the support member 59. A similar track actuating shaft 329 (FIG. 9) is journalled in bearings 331 secured to a bracket 332 which is bolted to the support member 58. A crank arm 333 keyed on the track actuating shaft 329 is pivotally connected to the rocker arm 319 by a link 334.

The track actuating shafts 326 and 329 (FIG. 4) have arms 336 and 337, respectively, keyed thereon, and the arms 336 and 337 each have a short section 233c and 233d, respectively, of the cover opening tracks 233 welded thereon. The section 233c (FIG. 8) is disposed adjacent the chain 177 while the section 233d (FIG. 9) is adjacent the chain 176.

It is apparent that each pivotal actuation of the rocker shaft 316 (FIG. 4) by the cam 314 causes the shafts 326 and 329 to pivot. The pivotal movement of the shafts 326 and 329 is timed with the movement of the conveyor 28 in such a way that the wear bushings 232 (FIGS. 8 and 9) on the cover actuating arms 229 of each cover enter the track sections 233c and 233d and remain in the sections until the cover has been opened and closed by the pivotal movement of the track sections 233c and 233d. When the sections 233c and 233d are pivoted outwardly to the position shown in FIG. 8, to open a carrier cover 227, the line of cans in the associated carrier pocket P is moved from the pocket P by the action of gravity and by being positively pushed therefrom by the trailing section of the carrier cover 227. The line of cans rolls out of the pocket P onto the can abutment surface 234 of the cover 227 disposed therebelow and thereafter gravitates into a discharge conveyor guide trough 338. The upper run of the discharge conveyor 165 is continuously driven through the guide trough 338 by any suitable drive means. The guide trough is suitably bolted to the supporting members 58 and 59 and is supported by a frame 341 carried on the upper platform 60.

The drive for the feed unit 26 (FIGS. 2 and 4) and the discharge unit 29 comprises a sprocket 346 keyed to the shaft 198 and connected to the sprocket 309 that is rotatable on the shaft 306, by a chain 347. The sprocket 311, which is fixed to the sprocket 309, is connected to the sprocket 259 keyed on the cam shaft 251 by a chain 348 which drives the shaft 251 in a counterclockwise direction as viewed in FIG. 4. A chain 349 connects the sprocket 258 to the sprocket 313, which sprockets are the same size, and drives the cam shaft 306 of the discharge unit in the same direction and at the same speed as the shaft 251 and in timed relation with the movement of the conveyor 28.

As has been mentioned previously, the can arresting unit 164 (FIGS. 6 and 10 to 14) is disposed on the inlet side of the feed conveyor 161 to prevent cans from entering the feed unit when the feed unit 26 is being actuated to push a line of cans into an open pocket.

The can arresting unit 164 is mounted on a sub-frame 351 which is supported on the upper platform 60 (FIG. 10) and is connected to the conveyor support members 58 and 59 by the elongated bracket 294, which provides the inclined ramp down which each line of cans is rolled into the open pocket of a carrier.

The endless belt feed conveyor 161 is trained around a grooved drive pulley 352, a grooved driven pulley 353, a snubbing pulley 354 and a take-up pulley 356. The pulleys 352, 353, 354 and 356 are suitably journalled on the frame 351 and the drive pulley 352 is driven by a gear motor 357 connected thereto by a chain drive 358. The upper run of the conveyor 161 (FIG. 10) is guided along an angle track 359 (FIG. 6) which is secured to the frame 351 by brackets 361. An angle member 363 of the frame 351 extends the full length of the conveyor 161 and is disposed adjacent one side edge of the conveyor 161 with its upper surface in planar alignment with the upper surface of the upper run of the conveyor 161. Likewise, two aligned angle members 364 and 366 have their upper surfaces in planar alignment with the upper surface of the conveyor 161. The angle members 364 and 366 are disposed adjacent the other side of the conveyor 161 and the elongated bracket 294 is disposed between the members 364 and 366.

Two pairs of bellcranks 367 and 368 (FIGS. 10 and 11) are secured to pins 369 and 371, respectively, and the pins 369 and 371 are journalled in blocks 372 secured to the angle track 359. A pivot pin 373 connects the two bellcranks 367 and pivotally supports one end of a pair of can lifting bars 374. The other ends of the lifting bars 374 are pivotally received on a pin 376 which is secured to the other pair of bellcranks 368. The angle track 359 is slotted to receive the pins 373 and 376 and to allow the pins to be moved upwardly upon pivotal movement of the bellcranks 367 and 368. Likewise, the lifting bars 374 are slotted below the pin 369 so that the bars may be raised. A link 378 (FIG. 10) is pivotally connected to both pairs of the bellcranks 367 and 368 so that movement of one arm will be transmitted to the other. An air cylinder 379 is pivotally connected to and extends between a bracket 381 secured to one of the brackets 361 and the pair of crank arms 367. Air under pressure entering the cylinder 379 through a port 383 will cause the crank arms 367 and 368 to pivot clockwise (FIG. 10) thereby raising the can lifting bars 374, and cans disposed thereabove, to the phantom line position shown in FIG. 14. The bars are returned to the position shown in FIGURE 10 by a spring (not shown) inside the cylinder 379 when the air is bled from the cylinder 379. When the bars 374 are in the raised position, the cans are lifted off the conveyor 161 and are pushed into locking engagement against a resilient pad 384 disposed above the bars 374 and bolted to the frame 351. The pad 384 can be adjusted vertically to adapt the machine for operation with cans of different size.

The pad 384 and lifting bars 374 cooperate to stop all cans which are upstream of the foremost can which is firmly gripped by the pad 384. However, if a can should be gripped between the pad 384 and the lifting bars 374 at its rearmost edge only, the foremost edge of the can will bear against the continuously moving conveyor 161 and may be dislodged from the pad 384 at a time in the operating stroke of the feed unit 26 which would cause the can to be moved transversely off the conveyor 161 when it is not in proper position to enter the particular pocket P being loaded. In order to arrest the movement of this can, an abutment pin assembly 386 (FIG. 6) is employed. In general this emergency can stopping mechanism comprises an abutment pin 387 (FIG. 13) resiliently supported in a cylinder 389. When a line of end-to-end cans are in the push-off station, the cylinder 389 is moved bodily downwardly to project the abutment pin 387 into the path of movement of cans advancing toward the push off station.

The abutment pin 387 of the assembly 386 is rigidly secured to a collar 388 (FIG. 13) that is slidably received in the cylinder 389. A lower end cap 391 is in press fit engagement with the cylinder 389 and is apertured to slidably receive the lower end of the abutment pin 387 which projects therethrough. A pin 392 is secured to the collar 388 and is slidably received in a hole 393 in the end cap 391 and serves to prevent the abutment pin 387 from rotating in the cylinder 389. An upper end cap 394 is rigidly secured to the upper end of the cylinder 389. A collar 396, which is slidable in the cylinder 389 and on the abutment pin 387, is spaced from the upper end cap 394 by a spacer ring 397 and is held thereagainst by a spring 398. The spring 398 is disposed between the collar 396 and the collar 388 and will allow the abutment pin 387 to move upwardly within the cylinder 389 if the assembly 386 should be moved downwardly when the pin 387 is directly over a can rather than between spaced cans as is desired. One side of the lower end of the pin 387 is rounded, as at 399, to permit the bead of a can, upon which the pin has been lowered, to move in the direction of the arrow in FIGURE 13 past the pin 387.

The abutment pin assembly 386 is mounted for vertical movement on an angle bracket 401 (FIGS. 10 and 12) secured to the bracket 288, which supports one end of the shaft 286, by a pair of parallel bars 402. The parallel bars 402 are pivotally mounted to the bracket 401 by bolts 403 and to a cylinder supporting bracket 404 by bolts 406. The cylinder 389 has a support block 407 (FIG. 12) which is drilled to receive a cap screw 408 that extends through a vertical slot in the cylinder supporting bracket 404 to permit vertical movement of the cylinder 389 relative to the bracket 404. An ear 412 welded to the bracket 404 receives a threaded stud 413 which extends through a hole in an ear 414 welded to the cylinder 389. Lock nuts 416 and 417 (FIG. 13) screwed on the stud 413 and disposed above and below the ear 414, respectively, provide means for vertically adjusting the cylinder 389 relative to the bracket 404. After the cylinder 389 has been properly adjusted, the nuts 416 and 417 and cap screw 408 are tightened to lock the cylinder 389 in adjusted position. It will be seen that the parallel bars 402 pivotally support the bracket 404 and the attached cylinder 389 for movement in a generally vertical direction.

The vertical movement of the cylinder 389 is controlled by an air cylinder 418 (FIG. 6) which is pivotally connected to a bracket 419 secured to the frame 351 and to the support member 58. The cylinder 418 has an actuating element 421 pivotally connected to the upper end cap 394 (FIG. 13) by a pivot pin 422. Air entering the cylinder 418 (FIG. 6) through a port 423 will move the abutment pin assembly 386 downwardly to a position where the abutment pin 387 lies in the path of movement of cans in the feed conveyor 161. In the event a can is disposed directly under the abutment pin 387 when the assembly is moved down, the upper surface of the can will slide under the pin and after the can has moved past the abutment pin, the spring 398 will urge the pin 387 into the path of movement of the cans. When air is bled from the cylinder 418, a spring (not shown) in the cylinder will raise the abutment pin assembly 386 and the pin 387 above the path of movement of the cans on the conveyor 161.

The actuation of the air cylinders 379 and 418 (FIG. 10) is timed with the movement of the feed unit 26, the feed conveyor 161 and the can carrier conveyor 28. This timed relation is such that the air cylinder 379 is actuated first to raise the bars 374 and to lock a can or cans supported thereon against the pad 384, thereby stopping the following cans. After sufficient time has been allowed for a can disposed between the pad 384 and the abutment pin 387 to move past the abutment pin 387 and into the feed push-off station, the cylinder 418 is actuated to move the abutment pin assembly 386 downwardly. After the assembly 386 has been moved down, the pin 387 will normally stop any cans vibrated loose from the pad 384. However, if a loose can gets under the pin 387, it will be permitted to move past the pin 387 and into the feed unit 26. The feed unit 26 is then actuated to move the line of cans into the open pocket to be filled. If the area between the pad 384 and the upstream end of the can pusher bar 293 of the feed unit 26 is completely filled, it is apparent that the can stopping wing 295 (FIG. 6) will prevent these cans from entering the feed unit 26 and fouling the same.

Figure 15:
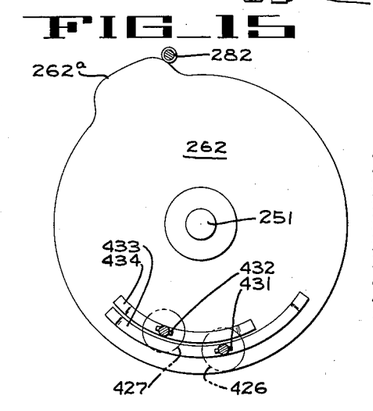
FIG. 15 is a vertical section taken along lines 15—15 of FIG. 7, certain parts being shown in phantom.

The structure for actuating the air cylinders 379 and 418 (FIG. 10) comprises air valves 426 and 427 (FIGS. 7 and 15) which are connected to a source of high pressure air (not shown) and to the port 383 (FIG. 10) of the cylinder 379 and the port 423 of the cylinder 418, respectively, by air lines (not shown). The valves 426 and 427 are bolted to a bracket 429 (FIG. 7) which is, in turn, bolted to the support member 58. The valves 426 and 427 have cam followers 431 and 432, respectively, on their actuating elements. The cam followers 431 and 432 are arranged to be actuated by arcuate cams 433 and 434, respectively, which are welded on the face of the cam 262. As shown in FIG. 15, upon rotation of the cam 262, the cam follower 431 of the valve 426 contacts the arcuate cam 433 to open the valve and direct air into the cylinder 379 (FIG. 10) thereby raising the bars 374 of the can arresting unit. The cam follower 432 (FIG. 15) of the valve 427 then contacts the arcuate cam 434 to direct air into the cylinder 418 (FIG. 6) thereby lowering the abutment pin assembly 386. Shortly thereafter, the cam follower 282 (FIG. 15) is actuated by the lobe 262a of the cam 262 to cause the can pusher bar 293 (FIG. 6) to push a line of cans off the conveyor 161. The cam followers 282, 231 and 232 then move out of contact with their respective camming surfaces simultaneously, thereby allowing air to bleed from the cylinders 379 and 418 permitting the bars 374 to lower and the abutment pin 421 to raise at the same time that the bars 292 and 293 of the push-off unit 26 return to a position to receive cans therebetween.

Although the operation of the different parts of the continuous cooker and cooler 16 of the present invention have been included with the description of these parts, a summary of the operation will follow.

Filled and sealed cans are conveyed from a seamer by a conveyor 156 (FIG. 1) and are discharged into the chute 157 which delivers the cans to the upwardly moving run of the elevator 23. The cans are discharged from the elevator 23 onto the conveyor 159 (FIG. 2) and from the conveyor 159 to the feed conveyor 161. The can arresting unit 164 (FIG. 10) and the abutment pin 387 control the movement of the cans on the conveyor 161 and eliminate the possibility of cans being disposed partially out of the feed unit 26 (FIG. 6) when the push-off bar 293 is pivotally actuated. Pivotal actuation of the bar 293 pushes a line of cans from the conveyor 161 down the inclined surface 296 and into an open pocket P of the particular carrier 27 disposed in position to receive the cans from the inclined surface 296. Each carrier cover 227 is opened in its turn by the cover controlling track sections 233a and 233b (FIG. 4) which are cam actuated to swing outwardly as they pass the lower edge of the surface 296 (FIG. 6) immediately before the bar 293 is cam actuated to move a line of cans off the conveyor 161.

The covers 227 of the filled carriers are closed when the track sections 233a and 233b return to a position in alignment with the main track sections 233. The filled carriers 27 move down and then up through the water in the cooking chamber 18 (FIG. 1) and thereafter down and up through the sprays of cooling water in the cooling chamber 19. The water in the cooking chamber 18 is heated by steam entering the chamber 18 through the pipeline 141. Makeup water enters the chamber 18 through the pipeline 111 to maintain a temperature gradient in the chamber 18 which varies from approximately 210° F. at the surface of the water to approximately 238° F. at the bottom of the chamber. Since different products require different cooking times, the height of water in the chamber 18 can be raised or lowered by opening selected ones of the valves 117 in the water level control conduits 116.

After the cans have been cooked and have passed through the water sprays in the cooling chamber 19, they are discharged from the carriers 27 (FIG. 8) by the discharge unit 29 when the cans are at approximately 100° F.

As the carriers 27 pass upwardly through the discharge unit 29, the cover controlling cam track sections 233c and 233d (FIG. 4) are cammed outwardly thereby opening each pocket P (FIG. 8) in turn, allowing the line of cans therein to gravitate onto the conveyor 165. The discharged cans are moved by the conveyor 165, onto a conveyor 166 (FIG. 2) and from the conveyor 166 onto a conveyor 167. The conveyor 167 guides the cans through a can turning unit 169, which turns the cans 90°, and discharges the cans therefrom onto the downwardly moving run 170 of the elevator 23 (FIG. 1). The cans are guided from the elevator 23 by the chute 171 onto the conveyor 156. The conveyor 156 carries the cans away from the cooker and cooler 16 of the present invention.

From the foregoing description it is apparent that the cooker and cooler of the present invention includes can carriers which completely constrain cans therein without the aid of special can constraining walls and baffles. This feature makes it possible to use a cylindrical pressure resisting wall for the cooking chamber which is much less expensive than flat walls. The improved cooker and cooler also includes improved can feeding and discharging units which units are simple in design and dependable in operation. The J-shaped can constraining beam or wall of the carrier is so designed that the cover, with which it cooperates to enclose a can, can pivot freely without coming into contact with the beam. It is also to be particularly noted that the cover of the carrier is always under the control of the cam tracks, and the cam tracks are so designed that the covers are not permitted to open wide enough to discharge any can except at the discharge station.

The can arresting unit and the emergency abutment stop pin provide an exceptionally effective means of preventing jamming of cans in a cooker.

While one embodiment of the present invention has been shown and described, it will be understood that various changes and modifications may be made therein without departing from the spirit of the invention or the scope of the appended claims.

Having thus described the present invention, what is claimed as new and desired to be protected by Letters Patent is:

1. In an apparatus for processing comestibles in containers, an endless conveyor arranged to be moved in a predetermined path, an elongated container carrier on said conveyor, an elongated semicylindrical cover pivotally mounted on said carrier and arranged to be moved from a closed container-constraining position to an open container-receiving position, a cam track mounted on one side of said predetermined path and having a fixed section and a movable section, a cam follower slidably received in said cam track and operatively connected to said cover, a shaft mounted for rotation adjacent said movable track section, an arm keyed on said shaft and arranged to carry said movable track section, first cam means operatively connected to said shaft and timed with the movement of said carrier conveyor to pivotally actuate said movable track section to open said cover, an elongated conveyor bracket having an inclined surface disposed parallel to and immediately adjacent said movable track section, a feed conveyor movable adjacent said inclined surface and arranged to move a line of containers into position parallel to said cover, a shaft parallel to and mounted for rotation above said feed conveyor, a pair of spaced rods parallel to and disposed on opposite sides of the line of containers, means rigidly connecting said rods to said shaft, a linkage operatively connected to said shaft, and second cam means timed with said first cam means and arranged to actuate said linkage and rotate said shaft when an open cover is positioned adjacent the inclined surface of said bracket whereby one of said rods contacts the line of containers to move the same off the feed conveyor and onto said inclined surface for gravitation into the open cover.

2. In an apparatus for processing comestibles in sealed containers, a continuously driven conveyor, a plurality of container carriers on said conveyor, a carrier cover pivotally mounted on each carrier, an actuating arm on each cover, a cam follower on each arm, a cam track having a fixed portion and a movable portion arranged to receive each cam follower, a cam shaft journalled adjacent said conveyor, a first cam keyed on said cam shaft, a pivotally mounted support member arranged to carry said movable portion of said cam track, a linkage operatively connected between said first cam and said support member and arranged upon rotation of said shaft to pivotally actuate said support member to open and close each of said carrier covers in turn, a second cam keyed on said shaft, pusher means pivotally mounted adjacent said support member for pushing lines of containers into said carrier, and a second linkage operatively connected between said second cam and said pusher means and arranged to actuate said pusher means to push a line of cans into each carrier immediately after each carrier cover is opened by said first cam means.

References Cited in the file of this patent

UNITED STATES PATENTS

| | | |
|---|---|---|
| 902,826 | Loew | Nov. 3, 1908 |
| 994,192 | Pinkney | June 6, 1911 |
| 1,419,139 | Hunter | June 13, 1922 |
| 1,560,520 | Addison | Nov. 10, 1925 |
| 1,576,421 | Fooks | Mar. 9, 1926 |
| 2,044,118 | Huntley et al. | June 16, 1936 |
| 2,338,258 | Ray | Jan. 4, 1944 |
| 2,421,527 | Smith | June 3, 1947 |
| 2,757,780 | Sousa | Aug. 7, 1956 |
| 2,806,423 | Winden | Sept. 17, 1957 |
| 2,818,012 | Webster | Dec. 31, 1957 |
| 2,827,999 | Raynor | Mar. 25, 1958 |
| 2,874,821 | Ganter | Feb. 24, 1959 |

FOREIGN PATENTS

| | | |
|---|---|---|
| 977,560 | France | Apr. 3, 1951 |
| 350,627 | Great Britain | June 18, 1931 |